Dec. 18, 1945.   R. M. NARDONE   2,391,333
ACTUATING UNIT FOR RETRACTABLE LANDING GEAR
Filed Jan. 28, 1944   5 Sheets-Sheet 1

INVENTOR.
Romeo M. Nardone
John A. Robertson.
ATTORNEY

Dec. 18, 1945.     R. M. NARDONE     2,391,333
ACTUATING UNIT FOR RETRACTABLE LANDING GEAR
Filed Jan. 28, 1944     5 Sheets-Sheet 3

INVENTOR.
Romeo M. Nardone
BY John A. Robertson.
ATTORNEY

Dec. 18, 1945.   R. M. NARDONE   2,391,333
ACTUATING UNIT FOR RETRACTABLE LANDING GEAR
Filed Jan. 28, 1944   5 Sheets-Sheet 4
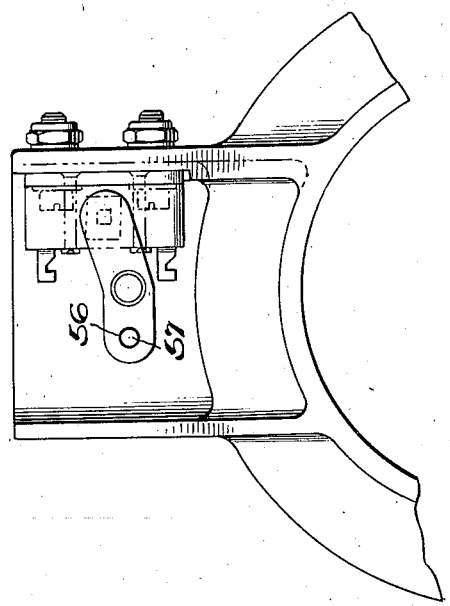
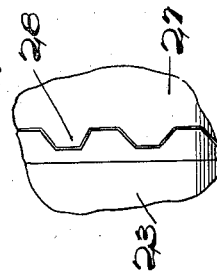
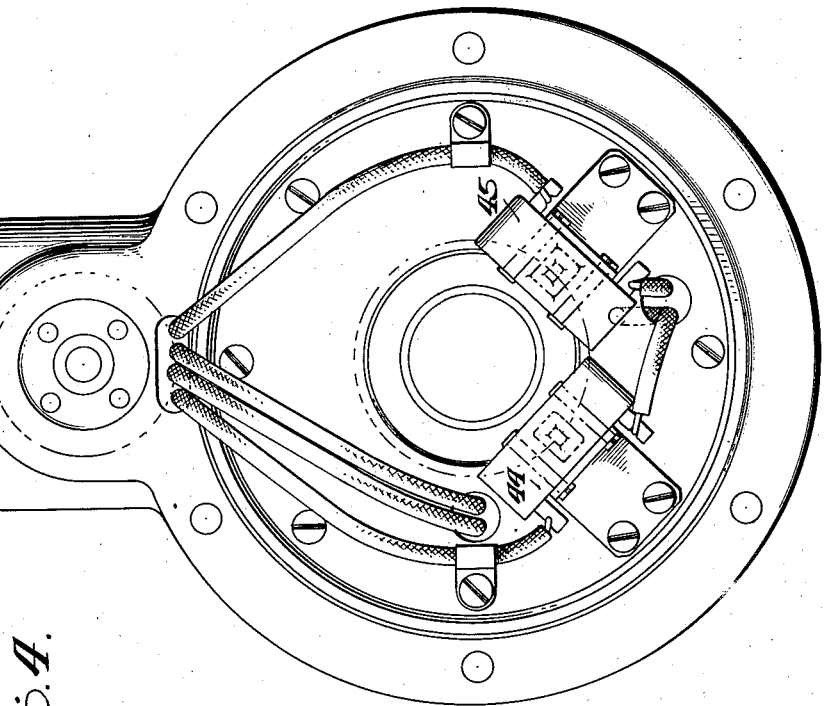
INVENTOR.
Romeo M. Nardone
BY John A. Robertson
ATTORNEY

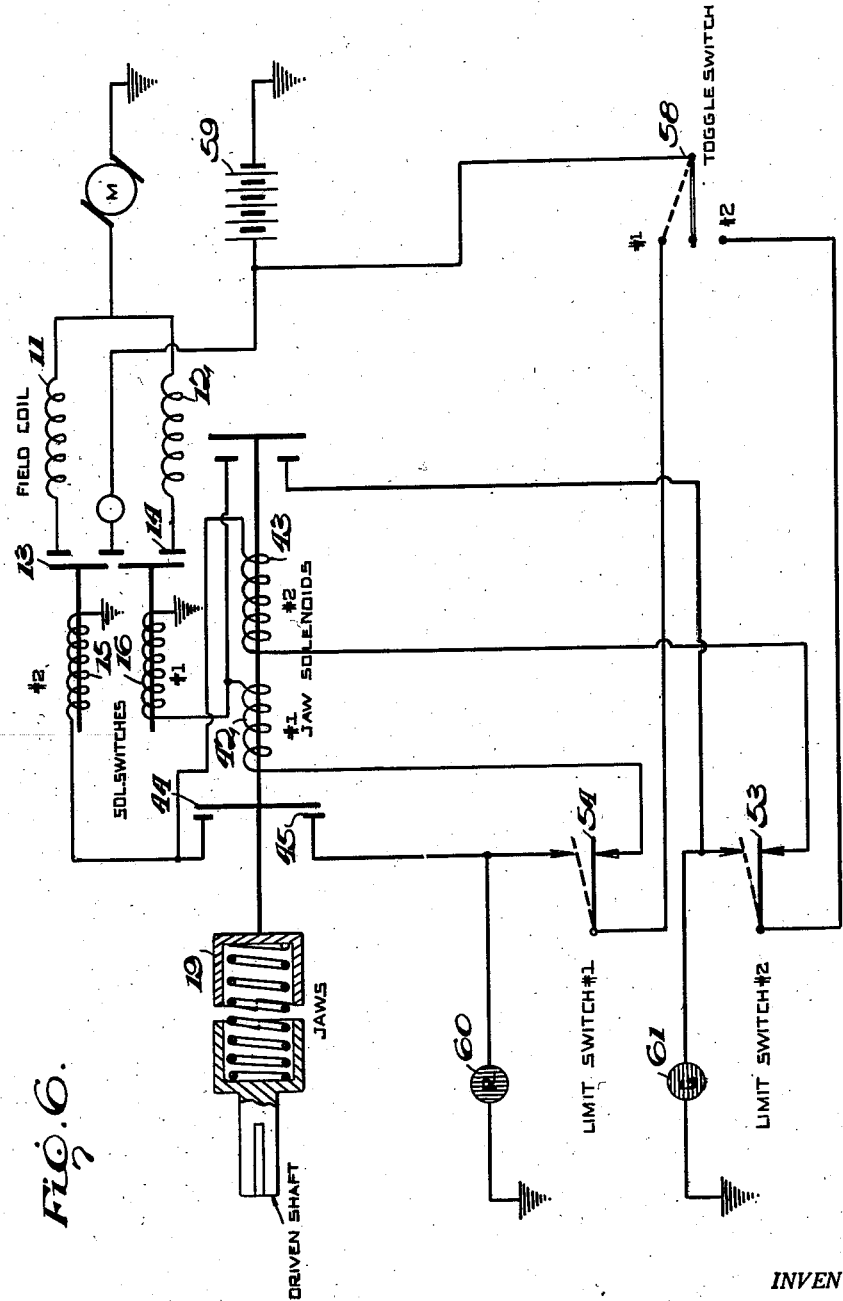

Patented Dec. 18, 1945

2,391,333

UNITED STATES PATENT OFFICE 2,391,333

ACTUATING UNIT FOR RETRACTABLE LANDING GEAR

Romeo M. Nardone, Teaneck, N. J., assignor to Bendix Aviation Corporation, Teterboro, N. J., a corporation of Delaware Application January 28, 1944, Serial No. 520,122

2 Claims. (Cl. 192—.02)

This invention has to do with retractable landing gears and is concerned primarily with the power units employed to actuate such devices.

In retracting or lowering a landing gear, it is highly important that the operation be carried out exactly over a predetermined interval, that is when the gear is being retracted it should be moved just so far and no further, and the converse of this is also true.

Accordingly, this invention has in view, as one of its objectives, the provision of an actuating unit of the character aforesaid which may be set to operate for a predetermined number of revolutions of its output shaft, whereupon it will be automatically brought to a full and complete stop without any overrun and irrespective of the load on the output shaft.

Another more detailed object is the provision of an actuating unit of the type noted, which when automatically stopped will be left in condition for operation in the reverse direction.

In carrying out these ideas, the invention proposes the use of a main jaw clutch which is controlled by a solenoid. This clutch is engaged or disengaged to control the delivery of power from an electric motor to the output shaft. The motor includes a pair of field coils, there being one for the operation of the motor in each direction and the energizing of these field coils is governed by solenoid-operated switches. A pair of limit switches is associated with the solenoid and solenoid switches and controls delivery of current to these elements.

In order to achieve the required gear ratio between the drive shaft and the motor and the output shaft, it is necessary to employ reduction gearing, and in accordance with this invention this reduction gearing takes the form of a planetary gear train. An important object of the invention is the provision in association with such a gear train of a friction clutch arrangement for maintaining substantially uniform the torque on the output shaft.

Various other more detailed objects and advantages of the invention such as arise in connection with the carrying out of the above noted thoughts in a practical embodiment will in part become apparent and in part be hereinafter stated as the description of the invention proceeds.

For a full and more complete understanding of the invention reference may be had to the following description and accompanying drawings wherein:

Fig. 3 is a view in end elevation with parts removed; while

Fig. 4 is a similar end elevational showing;

Fig. 5 is a detailed showing of the upper part taken from one end and bringing out the arrangement of one of the limit switches;

Fig. 6 is a wiring diagram; and

Fig. 7 is an enlarged detailed showing of a part of the novel friction clutch mechanism.

Figure 1:
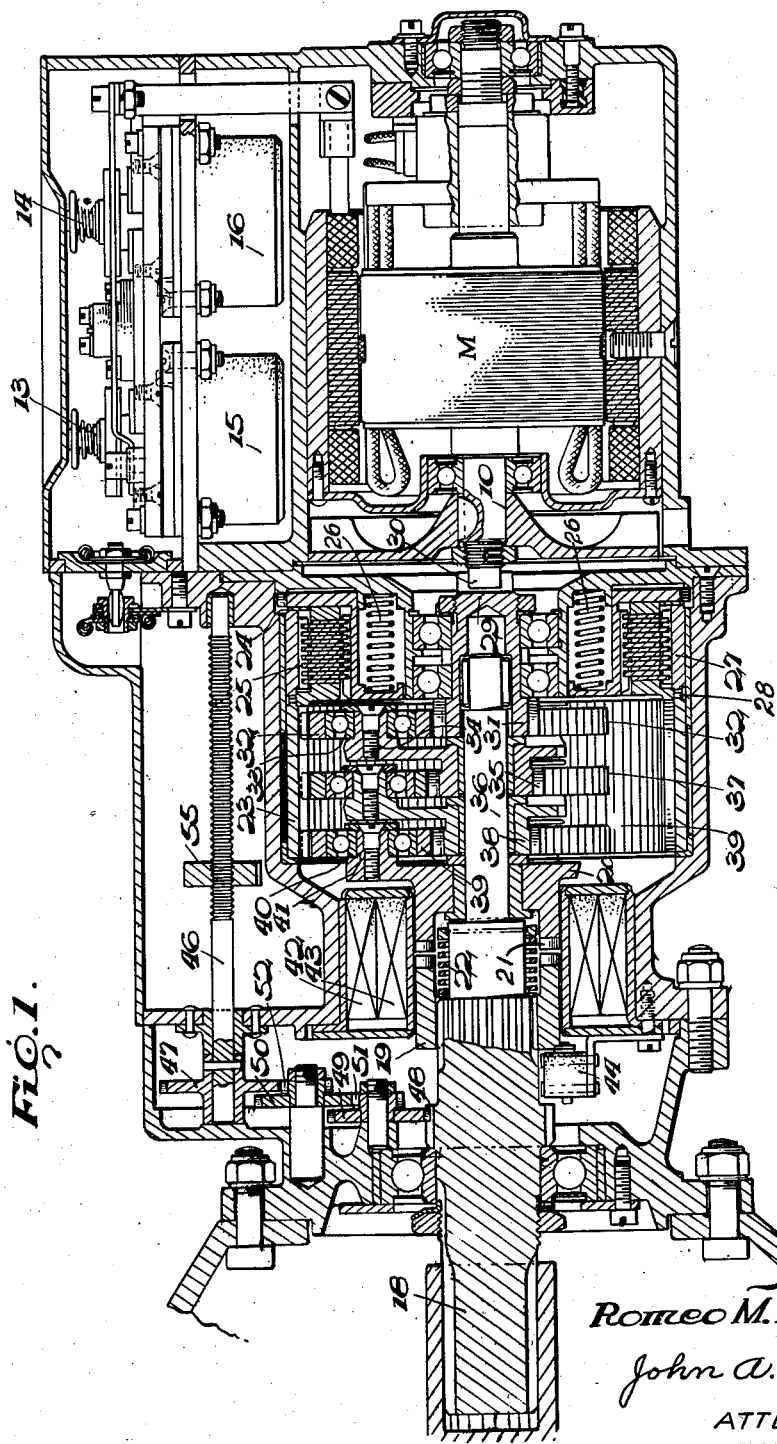
Fig. 1 is a vertical section through an actuating unit made in accordance with the precepts of this invention. In this view certain parts have been omitted to clarify the showing.

Referring now to the drawings, wherein like reference characters denote corresponding parts, and first more particularly to Fig. 1, the actuator unit of this invention is shown as comprising a motor identified as M. The motor M includes a drive shaft 10, which is adapted to be driven in reverse directions. The direction of rotation of the drive shaft 10 depends on which of the field coils of the motor are energized. This motor M includes two field coils which are depicted diagrammatically at 11 and 12 in Fig. 6.

A switch shown at 13 controls the energizing of the field coil 11, while another similar switch 14 controls the delivery of current to the coil 12. The switch 13 is governed by solenoid 15, and another solenoid 16 operates a switch 14.

The motor M, together with the associated instrumentalities above described, is enclosed in a housing designated H. This housing H may be secured to another casing designated C, which encloses the gear and other mechanisms. Bolts shown at 17 may be employed to assemble the housing H and the casing C.

The output shaft, which is intended to be driven by the motor M to operate the landing gear, is represented at 18. This shaft 18 slidably carries, in driving relation, a jaw element 19. Cooperating with the jaw element 19 is another complemental jaw element 20. These jaw members 19 and 20 have interfitting teeth, shown at 21. An expansion spring 22 encircles a reduced portion of the shaft 18 and exerts a tendency to separate the jaw elements 19 and 20 and thus disengage the teeth 21.

A train of planetary gears is interposed between the drive shaft 10 in the motor M and the jaw element 20. This planetary gearing comprises an annulus 23, which is intended to be held stationary when the gear reduction obtains.

A stationary plate is shown at 24 and friction clutch elements 25 are interposed between the gear annulus 23 and the plate 24. Expansion springs 26 act on the friction clutch elements and determine the efficiency of the latter. When the pressure of the springs 26 is great there is little if any slippage of the clutch elements and the gear annulus 23 is held substantially stationary; but if the tension of the springs 26 is reduced, the amount of slippage increases and a certain amount of movement of the gear annulus 23 is permitted.

To provide for variation in the tension of the springs 26, a cylindrical member 27 is interposed between the plate 24 and annulus 23. As clearly shown in Fig. 7, the abutting or engaging faces of annulus 23 and cylinder 27 are formed with complemental tapered splines 28. As the primary purpose is to provide for a constant torque, any overload on the output shaft 18 will affect the gear annulus 23 and through the tapered splines 28 cause the cylinder 27 to be urged against the plate 24 and by retracting the latter the tension of the springs 26 is reduced.

The drive shaft 10 of the motor M is drivably connected to a stub shaft 29 by means of the shaft coupling represented at 30. Formed integrally with the stub shaft 29 is a sun gear 31. Meshing with the sun gear 31 and also with the internally threaded gear annulus 23 are a plurality of planet gears 32. Three of the planet gears 32 may be employed. Each of the planet gears 32 is formed with a hub 33, which receives a short shaft 34 that is carried by, and in offset radial relation to, a sun gear 35. The sun gear 35 is mounted for free rotation on a shaft 36 that finds bearing in the stub shaft 29 at one end and the jaw element 20 at the other.

Meshing with the sun gear 35 and also with the internally threaded gear annulus 23 are a plurality of planet gears 37 that are similar in all respects to the planet gears 32. These planet gears 37 are also provided with hubs which receive short shafts carried by, and in offset relation to, another sun gear 38. Meshing with the sun gear 38 and the internal threads of the annulus 23 are another set of planet gears 39. These planet gears 39 correspond to the planet gears 32 and 37 and are formed with hubs 40 which receive stub shafts 41 that are carried by the jaw element 20.

It is evident that when the gear annulus 23 is held stationary, the planetary gear mechanism above described, is effective to provide for a substantial gear reduction between the drive shaft 10 of the motor M and the driven shaft 18. However, when any movement on the part of the gear annulus 23 is permitted, as by slippage of the friction clutch elements, the gear ratio varies. Thus a substantially uniform torque value may be maintained.

A pair of concentric solenoids are shown in 42 and 43, respectively. These solenoids are shown as encircling the jaw elements and are particularly intended to control sliding movement of the sliding jaw element 19.

A pair of micro contacts, which are shown clearly in Fig. 4 at 44 and 45 are intended to be made or broken by movement of the jaw 19, as will later become apparent. These contacts are also represented diagrammatically in Fig. 6.

Appropriately journaled in the upper portion of the casing C is a screw shaft 46. At one end this shaft 46 carries, in driving relation thereto, a gear 47. The output shaft 18 carries a gear 48. Interposed between the gears 47 and 48 is a gear train comprising gears 49 and 50 which carry pinions 51 and 52. It is evident that gears and pinions 47 through 52 provide for the driving of the screw shaft 46 coincident with and from rotation of the output shaft 18.

Figure 2:
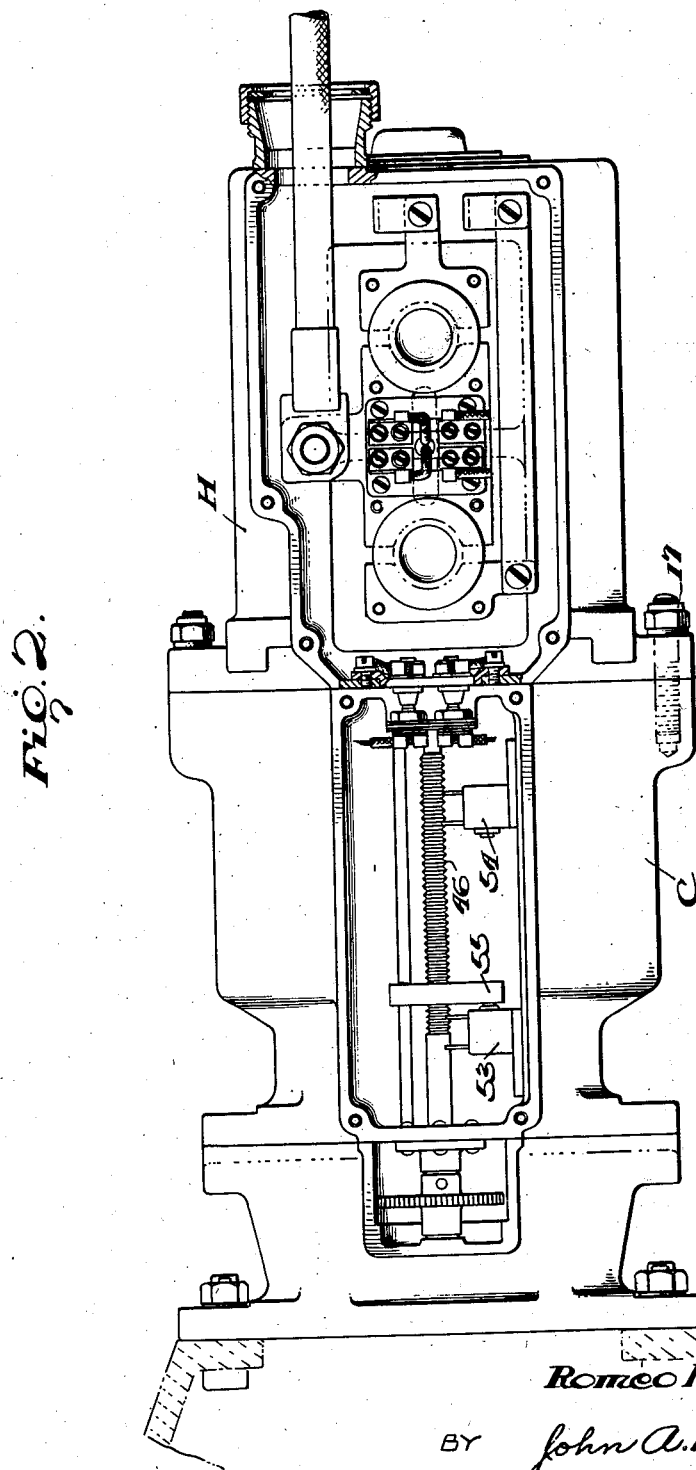
Fig. 2 is a top plan view with the cover removed.
Figure 3:
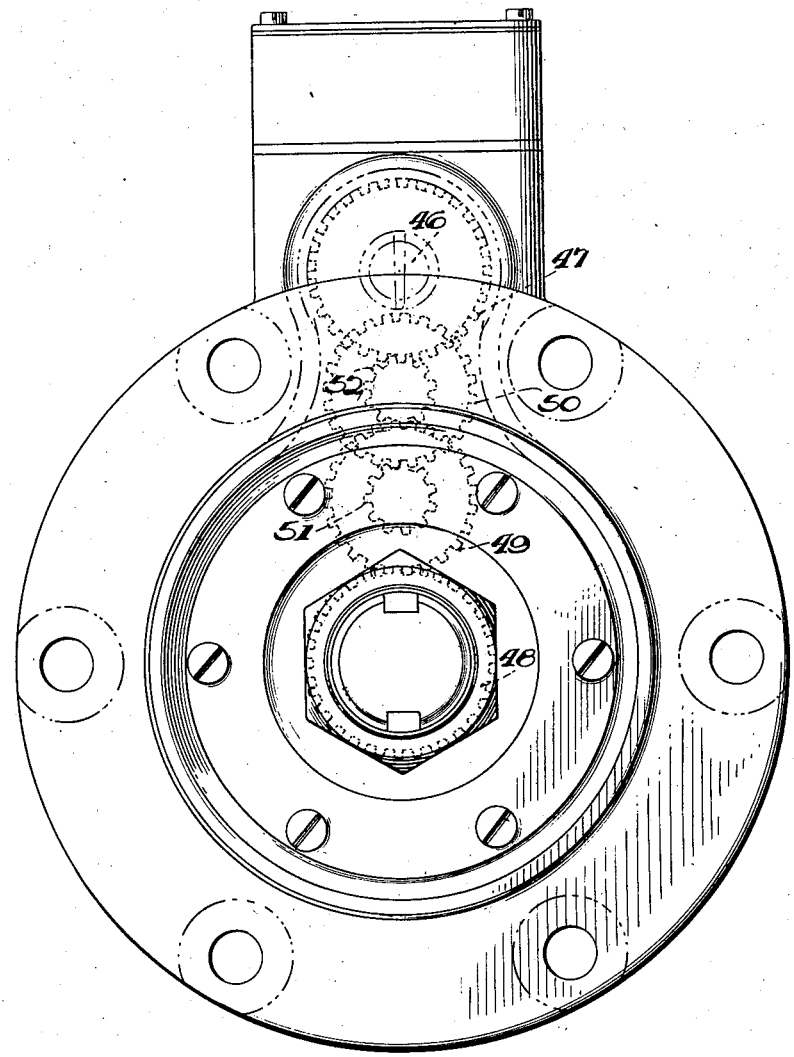

As is more clearly brought out in Fig. 2, the inner wall of the upper portion of the casing C carries a pair of limit switches 53 and 54. These limit switches 53 and 54 are spaced apart a required predetermined distance and adapted for cooperation therewith is an arm 55. The arm 55 has a threaded opening which receives the screw shaft 46. It also is formed with another smooth bore at 56 which receives a smooth guide rod 57.

It is evident that as the shaft 46 is rotated, the arm 55 is moved in one direction or the other depending upon the direction of rotation and when it reaches either of the limit switches 53 and 54, that switch is operated to change the position of the contacts thereof.

A three-position, hand-operated toggle switch will be appropriately located in the aircraft on which this actuating unit is mounted. This switch constitutes the main control switch and is represented diagrammatically in the wiring diagram of Fig. 6, and is designated 58. An appropriate source of current supply is represented by the battery shown at 59. Indicating lights represented diagrammatically at 60 and 61 in the wiring diagram of Fig. 6 may also be included and will be located where they may be conveniently seen by the pilot.

The operation of the above-described mechanism may be readily described by first referring to the wiring diagram of Fig. 6. The toggle switch 58 will be operated to either retract or lower the landing gear, as the case may be.

Assuming, for illustrative purposes, that the landing gear is to be retracted, the toggle switch will be raised to the position marked 1 in the wiring diagram. Prior to the closing of the toggle switch, the contacts of the limit switch 54 will be in proper position to cause delivery of the current from the battery 59 to the jaw solenoid 42 and the solenoid switch 16. This takes place when the toggle switch is upraised into its No. 1 position.

As the current is so delivered, two things take place: the jaw element 19 is moved into closing engagement with the jaw element 20, this action being caused by the solenoid 42. As the jaw element 19 moves it makes the contacts 44 and 45, but the circuit through these contacts is not at this time completed.

At the same time the field coil 12 of the motor M is energized due to operation of the switch 14 by solenoid 16. The motor M is then started in operation in the proper direction and its drive shaft 10 through the planetary gear train and jaw clutch 19, 20 drives the output shaft 18.

As this shaft starts to rotate, the screw shaft 46 is also driven. As the screw shaft 46 turns, the arm 55 is moved and this operation continues until the arm 55 engages the limit switch 54. When this happens the contact arrangement of the latter is reversed, which causes three things:

The first is the discontinuance of delivery of current to the solenoid 42. This renders the solenoid ineffective and the spring 22 may now disengage the jaw clutch elements 19 and 20. However, there may be a tendency of the latter to stick or jam and this is avoided by the fact that the field coil 11 of the motor M is now energized rather than the field coil 12. This stops the motor and starts operation in a reverse direction. Thus the teeth of the jaw clutch are freed from each other and may readily disengage under the influence of the spring 22. The above action results due to current passing through contacts 44 and 45 to solenoid 15 and its contacts 13.

As the jaw element 19 is freed from the jaw element 20 the micro contacts 44 and 45 are now broken, which causes complete stoppage of the motor M. The mechanism will now be in condition for operation to lower the landing gears. This means that the toggle switch 58 will merely be moved into its No. 2 position, whereupon the same operation above-described takes place except that the solenoid 43 is first energized and the solenoid switch 15 operated to energize the field coil 11 to cause operation of the motor M in the proper direction.

As the output shaft is driven, the arm 55 will be moved into engagement with the limit switch 53 rather than the limit switch 54, as above described.

The feature of automatically momentarily reversing the motor of an actuator as the driven element approaches a limit is not claimed herein but is claimed in the copending application, Serial No. 520,121, filed by the same applicant upon the same date: January 28, 1944.

While only one embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. An actuating unit for an air-craft remotely controlled element, comprising a motor including a drive shaft and a pair of field coils for rotating said shaft in opposite directions, an output shaft, complemental jaw clutch elements between said shafts, said clutch elements being adapted to be engaged to establish the driving relation between said shafts and disengaged to break the driving relation, a solenoid controlling said jaw elements, a solenoid switch for each of said field coils, a pair of spaced limit switches operatively connected to said solenoid and solenoid switches, a member movable between said limit switches to actuate one or the other, means drivably connected to said output shaft to cause movement of said member to engage one of said limit switches after a predetermined number of revolutions of said output shaft, contact means included in the circuit of said solenoid switches, and means to control said contact means from said jaw clutch elements whereby engagement of said clutch elements makes the contact and disengagement of the clutch elements breaks the contact.

2. The combination set forth in claim 1, including gear reduction means between said drive and output shafts, said means comprising planetary gear mechanism including an internal gear, a stationary plate, friction clutch means between said plate and internal gear for holding said internal gear against movement to render said planetary gear mechanism effective, and means responsive to variations in the load on the output shaft to maintain constant the torque by varying the effectiveness of said friction clutch means.

ROMEO M. NARDONE.